(12) United States Patent
Ma et al.

(10) Patent No.: US 10,921,772 B2
(45) Date of Patent: Feb. 16, 2021

(54) EQUIVALENT-PLANE CROSS-COUPLING CONTROL METHOD

(71) Applicant: Dalian University of Technology, Dalian (CN)

(72) Inventors: Jianwei Ma, Dalian (CN); Zhenyuan Jia, Dalian (CN); Dening Song, Dalian (CN); Fuji Wang, Dalian (CN); Wei Liu, Dalian (CN); Ning Zhang, Dalian (CN); Siyu Chen, Dalian (CN); Guangzhi He, Dalian (CN)

(73) Assignee: Dalian University of Technology, Dalian (CN)

( * ) Notice: Subject to any disclaimer, the term of this patent is extended or adjusted under 35 U.S.C. 154(b) by 123 days.

(21) Appl. No.: 16/311,922

(22) PCT Filed: Jan. 7, 2018

(86) PCT No.: PCT/CN2018/071688
§ 371 (c)(1),
(2) Date: Dec. 20, 2018

(87) PCT Pub. No.: WO2019/047457
PCT Pub. Date: Mar. 14, 2019

(65) Prior Publication Data
US 2019/0317468 A1 Oct. 17, 2019

(30) Foreign Application Priority Data

Sep. 11, 2017 (CN) .......................... 2017 1 0809039

(51) Int. Cl.
*G05B 19/19* (2006.01)
*G05B 11/42* (2006.01)

(52) U.S. Cl.
CPC .............. *G05B 19/19* (2013.01); *G05B 11/42* (2013.01); *G05B 2219/33099* (2013.01)

(58) Field of Classification Search
CPC .................... G05B 19/19; G05B 11/42; G05B 2219/33099
(Continued)

(56) References Cited

U.S. PATENT DOCUMENTS

2008/0234852 A1* 9/2008 Wang ................... G05B 19/401
700/114
2011/0218780 A1 9/2011 Yang et al.

FOREIGN PATENT DOCUMENTS

CN 102566500 A 7/2012
CN 104898564 A 9/2015
(Continued)

OTHER PUBLICATIONS

Performance analysis of cross-coupled controllers for CNC machines based upon precise real-time contour error measurement Jeremy R. Conway, International Journal of Machine Tools & Manufacture 52 (2012) 30-39.*

*Primary Examiner* — Jigneshkumar C Patel
(74) *Attorney, Agent, or Firm* — Troutman Pepper Hamilton Sanders LLP; Christopher C. Close, Jr.

(57) ABSTRACT

The invented equivalent-plane cross-coupling control method belongs to high-precision and high-efficiency intelligent multi-axis CNC (Computer Numerical Control) machining filed, featured a three-axis cross-coupling controller based on the equivalent plane which can be used for improvement of the three-dimensional contour-following accuracy. This method first find the foot point from the actual motion position to the desired contour using a tangential back stepping based Newton method. Then, establish an equivalent plane which containing the spatial contouring-error vector by passing through the actual motion position and the tangential line at the foot point. After that, estimate the three-dimensional contouring error in a scalar form, thus controlling the signed error using a PID based two-axis (Continued)

Figure 3:
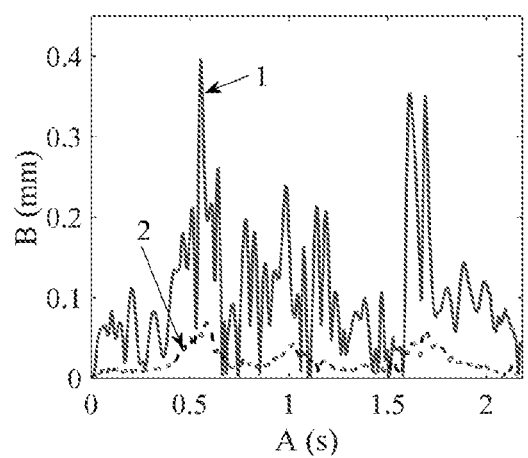

cross-coupling controller. Finally, calculate the three-axis control signals according to the geometry of the equivalent plane, thus realizing the three-axis contouring-error control by using the well-studied two-axis contour controllers.

1 Claim, 2 Drawing Sheets

(58) Field of Classification Search
USPC .......................................................... 700/187
See application file for complete search history.

(56) References Cited

FOREIGN PATENT DOCUMENTS

| CN | 106125673 A | 11/2016 |
|---|---|---|
| CN | 106200553 A | 12/2016 |
| CN | 106843146 A | 6/2017 |

\* cited by examiner

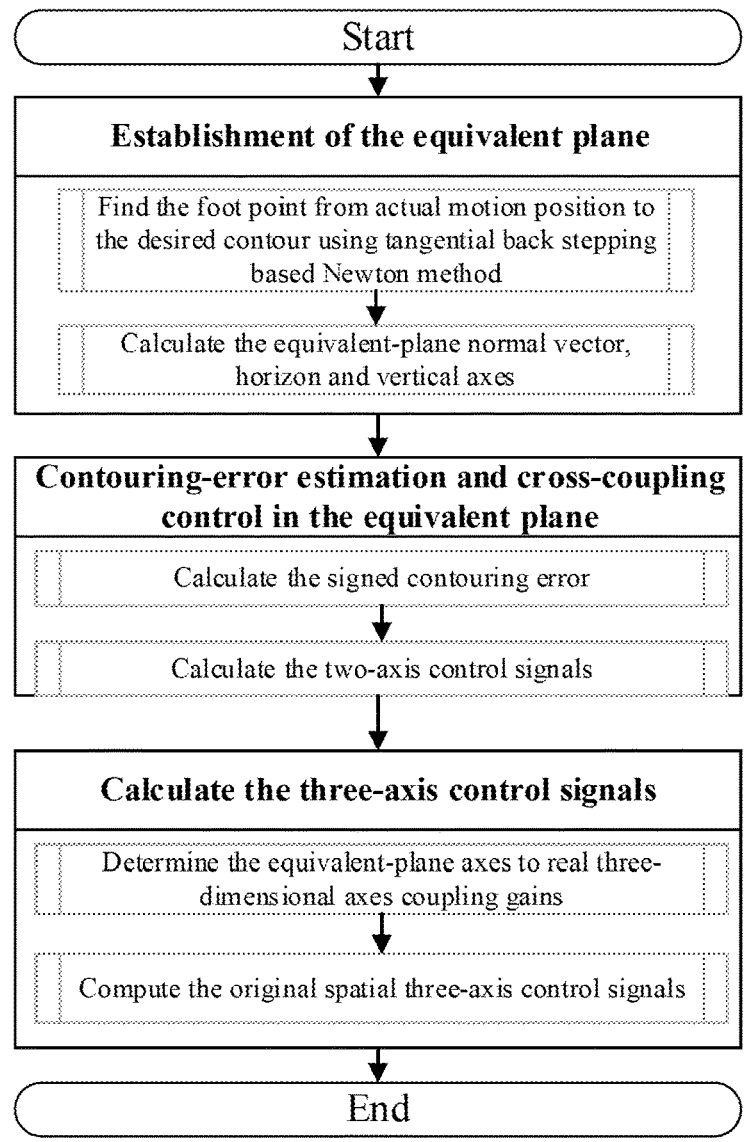
Fig. 1 (Fig.1 as an illustration in Abstract)
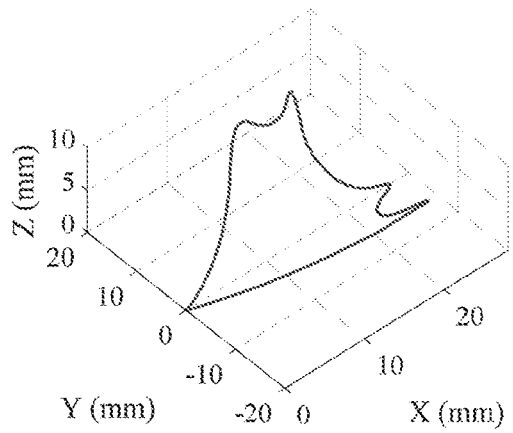
Fig. 2

EQUIVALENT-PLANE CROSS-COUPLING CONTROL METHOD

TECHNICAL FIELD

This invention belongs to high-precision and high-efficiency intelligent multi-axis CNC (Computer Numerical Control) machining filed, featured an equivalent-plane cross-coupling control method which is used for improvement of the contour following accuracy of three-axis CNC systems.

BACKGROUND TECHNIQUES

Multi-axis contour following is the key task that the CNC system should fulfill in machining of parts with curved surfaces. Due to the existence of individual axis servo lag, the multi-axis dynamics mismatch, and external disturbances, etc., deviation between the real and desired motion paths in curved contour following will be formed, thus resulting in the contouring error. This error degrades the motion precision of the CNC machine tools, which decreases the machining accuracy. Therefore, research on contouring-error restrain method is of great significance for high-precision machining. Currently, the CCC (cross-coupling controller) is the main approach that can be used for contouring-error reduction, however, the three-axis CCCs are lacking although the two-axis CCCs have been widely researched. Because of the fact that the complex parts often possess spatial curved surface features, the three-axis cross-coupling control method is urgently needed.

In the state of the art, the paper "Analysis and Design of Integrated Control for Multi-Axis Motion Systems", Yeh et al., IEEE Transactions on Control Systems Technology, 2003, 11(3): 375-382, estimated the three-dimensional contouring error using a tangential-line approximation method, and took the norm value of the estimated contouring-error vector as the control object for the three-axis CCC. However, the design flexibility of the CCC will be degraded because the control object is always a positive value. In addition, the paper "A two-layered cross coupling control scheme for a three-dimensional motion control system", Zhang et al., International Journal of Machine Tools & Manufacture, 2015, 98: 12-20, established a two-layered CCC, where the two-axis contouring error was controlled by a bottom layer CCC and the third-axis induced contouring error was reduced by a top layer CCC. However, this method does not take the real three-dimensional contouring error as the direct control object, so that it merely suits the occasions where only two-dimensional contouring accuracy is mainly concerned.

Contents of the Invention

Aiming at solving the defects of the existing techniques, an equivalent-plane cross-coupling control method which can be used for three-axis contouring-error control is invented. In this method, a tangential back stepping based Newton algorithm is presented for approximation of the foot point from actual motion position to the desired contour. Then, an equivalent plane that containing the contouring-error vector is established according to the actual motion position and the tangential line at the foot point. In the two-dimensional equivalent plane, the three-dimensional real contouring-error vector is decoupled as a contouring-error scalar. Thus, a PID (proportional-integral-differential) controller based two-axis CCC is used in the equivalent plane to control the calculated contouring error scalar. Finally, the two control signals outputted by the two-axis CCC are coupled into the real three-axis control signals according to the geometry relationship between the equivalent plane and the actual space. By doing this, the three-axis contouring error can be effectively reduced using a well-researched two-axis CCC in the equivalent plane.

The technique proposal used in the present invention is an equivalent-plane cross-coupling control method. Its characteristic is that this method approximates the foot point from actual motion position to the desired contour using a tangential back stepping based Newton algorithm, and establishes an equivalent plane where the contouring-error scalar instead of vector can be obtained so that the PID controller based two-axis CCC can be utilized to constrain the spatial contouring error, thus improving the contour-following accuracy of three-axis CNC systems. The detail procedures are as follows.

Step One: Establishment of the Equivalent Plane

Denote the equation of the desired contour as $C=C(u)$, where u is the curve parameter. In addition, the desired and actual motion positions are denoted as $R=[r_x,r_y,r_z]$ and $P=[p_x,p_y,p_z]$, respectively. The parameter corresponding to the desired position is denoted as $u_r$. Define a tangential error $d_t(u)$ on a point of the desired contour $C(u)$ as the projection of the vector $C(n)-P$ on the tangential direction at the position of $C(u)$, and it is computed as:

$$d_t(u) = (C(u) - P) \cdot \frac{C'(u)}{\|C'(u)\|} \qquad (1)$$

where $C'(u)$ is the first-order derivative of $C(u)$ with respect to u, and $\|\ \|$ means the Euclidean norm.

The contouring error is defined as the orthotropic distance from the actual motion position to the desired contour. Therefore, the defined tangential error $d_t(u)$ must be zero when $C(u)$ happens to be the foot point from P to the desired contour. As a consequence, the foot-point parameter, denoted as $u_f$, can be obtained by solving the formula $d_t(u)=0$. To deal with this problem, the tangential back-stepping point parameter $u_b$ is first calculated by projecting the tangential error to the desired contour as:

$$u_b = u_r - \frac{(C(u_r) - P_p) \cdot C'(u_r)}{\|C'(u_r)\|^2} \qquad (2)$$

Then, the parameter $u_b$ is took as the initial value of the Newton method so as to find the solution $u_N$ of $d_t(u)=0$ by:

$$u_N = u_b - \frac{(\|C'(u_b)\|^2 \cdot (C(u_b) - P) \cdot C'(u_b))}{\left(\begin{array}{c}\|C'(u_b)\|^4 + \|C'(u_b)\|^2 \cdot (C(u_b) - P) \cdot C''(u_b) - \\ ((C(u_b) - P) \cdot C'(u_b)) \cdot (C'(u_b) \cdot C''(u_b))\end{array}\right)} \qquad (3)$$

At last, judge whether the convergence of the Newton method. If $|d_t(u_N)|<|d_t(u_b)|$, indicating that it is convergent, take the solution as the foot-point parameter $u_f$, i.e. let $u_f=u_N$. Otherwise, applying the tangential back stepping method again at $u_b$ to obtain the foot-point parameter $u_f$. To summarize, the foot-point parameter $u_f$ is calculated by the following equation:

$$u_f = \begin{cases} u_N, & |d_t(u_N)| < |d_t(u_b)| \\ u_b - \dfrac{(C(u_b) - P) \cdot C'(u_b)}{\|C'(u_b)\|^2}, & |d_t(u_N)| \geq |d_t(u_b)| \end{cases} \quad (4)$$

Establish the equivalent plane by passing through the actual motion position P and the tangential line of the desired contour at the approximated foot point $C(u_f)$. By doing this, the normal vector $n_E$ of the equivalent plane can be computed by:

$$n_E = (C(u_f) - P) \times \frac{C'(u_f)}{\|C'(u_f)\|} \quad (5)$$

where × means the outer production.

The equivalent-plane horizontal axis, denoted as $X_E$, is got as the intersection direction of the equivalent plane and the original XY plane. Furthermore, the equivalent-plane vertical axis, denoted as $Y_E$ is taken as a direction that perpendicular to $X_E$ and $n_E$. Their computation method is:

$$\begin{cases} X_E = \dfrac{n_E \times [0 \ 0 \ 1]^T}{\|n_E \times [0 \ 0 \ 1]^T\|} \\ Y_E = \dfrac{X_E \times n_E}{\|X_E \times n_E\|} \end{cases} \quad (6)$$

Step Two: Contouring-error calculation and cross-coupling control in the equivalent plane.

In the established equivalent plane, calculate the contouring error in a scalar form. The $X_E$-direction and $Y_E$-direction tracking errors from P to $C(u_f)$, denoted as $e_{x,E}$ and $e_{y,E}$, respectively, are computed as:

$$\begin{cases} e_{x,E} = (C(u_f) - P) \cdot X_E \\ e_{y,E} = (C(u_f) - P) \cdot Y_E \end{cases} \quad (7)$$

Thus, the estimated contouring error $\hat{\varepsilon}$ is:

$$\hat{\varepsilon} = C_{x,E} \cdot e_{x,E} + C_{y,E} \cdot e_{y,E} \quad (8)$$

where $C_{x,E}$ and $C_{y,E}$ are $X_E$-direction and $Y_E$-direction cross-coupling gains, respectively, and they are obtained by:

$$\begin{cases} C_{x,E} = -\sin(\theta) \\ C_{y,E} = \cos(\theta) \end{cases} \quad (9)$$

θ is the included angle of vectors C' ($u_f$) and $X_E$, and $$\theta = \arctan\left(\frac{C'(u_f) \cdot Y_E}{C'(u_f) \cdot X_E}\right).$$

Take the estimated signed contouring errors $\hat{\varepsilon}$ as the control object, and the PID controller based two-axis CCC is utilized to control it. The output control signal of the CCC at the time of t is thus obtained as:

$$U_c(t) = k_p \hat{\varepsilon} + k_i \int_0^t \hat{\varepsilon} \, dt + k_d \frac{d\hat{\varepsilon}}{dt} \quad (10)$$

where $k_p$, $k_i$, and $k_d$ are proportional, integral, and differential gains, respectively.

According to $U_c(t)$, the $X_E$-direction and $Y_E$-direction control signals, denoted by $\Delta_{x,E}$ and $\Delta_{y,E}$, respectively, are computed as:

$$\begin{cases} \Delta_{x,E} = C_{x,E} \cdot U_c \\ \Delta_{y,E} = C_{y,E} \cdot U_c \end{cases} \quad (11)$$

Step Three: Calculation of the three-axis control signals in the real space.

According to the geometry relationship between $X_E/Y_E$ and the spatial X/Y/Z axes, calculate the coupling gains from the two axes of the equivalent plane to the three axes of the real three-dimensional space as:

$$\begin{cases} k_{x,x} = X_E \cdot [1 \ 0 \ 0]^T \\ k_{x,y} = X_E \cdot [0 \ 1 \ 0]^T \\ k_{y,x} = Y_E \cdot [1 \ 0 \ 0]^T \\ k_{y,y} = Y_E \cdot [0 \ 1 \ 0]^T \\ k_{y,z} = Y_E \cdot [0 \ 0 \ 1]^T \end{cases} \quad (12)$$

where $k_{x,x}$, $k_{x,y}$ are gains from $X_E$ axis to X and Y axes, respectively, and $k_{y,x}$, $k_{y,y}$, and $k_{y,z}$ are gains from $Y_E$ axis to X, Y, and Z axes, respectively.

After that, the X-axis, Y-axis, and Z-axis control signals, denoted by $\Delta_x$, $\Delta_y$, and $\Delta_z$, respectively, are calculated as:

$$\begin{cases} \Delta_x = k_{x,x} \Delta_{x,E} + k_{y,x} \Delta_{y,E} \\ \Delta_y = k_{x,y} \Delta_{x,E} + k_{y,y} \Delta_{y,E} \\ \Delta_z = k_{y,z} \Delta_{y,E} \end{cases} \quad (13)$$

By adding the obtained $\Delta_x$, $\Delta_y$, and $\Delta_z$ to the control signals of X-axis, Y-axis, and Z-axis position loops, the equivalent-plane cross-coupling control can hence be realized, which can reduce the three-axis spatial contouring error effectively.

The beneficial effects of the invention is that the invented equivalent-plane cross-coupling, control method can estimated the three-dimensional contouring-error vector in a scalar form in the equivalent plane, so that the design flexibility of the contour controller can be improved, and additionally, the three-axis contouring error can be equivalently control by using well-studied two-axis CCCs.

INSTRUCTION FIGURES

FIG. 1: Overall flow diagram of the invented method;

FIG. 2: Geometric model of curved toolpath in Cartesian coordinate system;

FIG. 3: The contouring errors before and after utilization of the invented method, where A and B axes means the time with the unit of s and the contouring error with the unit of mm, respectively, and the curves 1 and 2 means the errors before and after utilization of the invented method, respectively.

SPECIFIC IMPLEMENTATION EXAMPLE

The specific implementation procedure of the invention is described in detail with an example in combination with the technical scheme and attached figures.

During curve-interpolation CNC motion, the contouring error will be formed due to the existence of single-axis tracking errors and multi-axis dynamic mismatch. To reduce the three-axis contouring error thus improving the CNC curved contour following accuracy, an equivalent-plane cross-coupling control method is invented.

FIG. 1 shows the overall flow diagram of the invented method, and FIG. 2 illustrates the geometry of the testing toolpath. By taking the curved toolpath shown in FIG. 2 as an instance, the detail implementation procedures are illustrated as follows.

According to the flow diagram shown in FIG. 1, execute the equivalent-plane cross-coupling control for the testing toolpath shown in FIG. 2.

First, establish the equivalent plane. According to the method provided in "Step One" of the contents of the invention, the tangential back stepping based Newton method is used to search the foot point $C(u_f)$ from actual motion position P to the desired contour $C(u)$. Then, utilize Eq. (5) to calculate the normal vector $n_E$ of the equivalent plane. Additionally, take Eq. (6) to calculate the horizon axis $X_E$ and vertical axis $Y_E$.

Second, contouring-error estimation and cross-coupling control in the equivalent plane. Take Eq. (8) to calculate the estimated signed contouring error $\hat{\varepsilon}$, then based on its PID control, calculate the $X_E$-direction control signal $\Delta_{x,E}$ and $Y_E$ direction control signal $\Delta_{y,E}$ in the equivalent plane.

Third, calculate the three-axis control signals. Determine the equivalent-plane axes to real three-dimensional axes coupling gains using Eq. (12), thus computing the X-axis control signal $\Delta_x$, Y-axis control signal $\Delta_y$, and Z-axis control signal $\Delta_z$ using Eq. (13). Add the control signals to the position loops of corresponding axes within each interpolation period, thus realizing the equivalent-plane cross-coupling control of the three-axis contouring error.

FIG. 3 illustrates the contouring errors before and after utilization of the invented method, where A and B axes means the time with the unit of s and the contouring error with the unit of mm, respectively, and the curves 1 and 2 means the errors before and after utilization of the invented method, respectively. As can be seen from FIG. 3 that before utilization of the invented method, the maximum contouring error is about 0.4 mm, while after using the invented method, the maximum contouring error is reduced to about 0.07 mm. As a conclusion, the invented equivalent-plane cross-coupling control method decreases the contouring error by 82.5%, which demonstrates that the method can effectively reduce the spatial contouring error and improve the three-axis contour following accuracy.

Aiming at controlling the three-axis contouring error induced by reasons such as servo lag and external disturbances, an equivalent-plane cross-coupling control method is invented. This method can estimated the spatial contouring error in a scalar form by establishment of the equivalent plane, which not only is beneficial to flexible design of the contour controller, but also can control the three-axis contouring error using the well-studied two-axis CCCs.

We claim:
1. An equivalent-plane cross-coupling control method, approximating to a foot point from actual motion position to a desired contour using a tangential back stepping based Newton algorithm, and establishing an equivalent plane where a contouring-error scalar instead of a contouring error vector can be obtained so that a proportional-integral-differential (PID) controller based two-axis cross-coupling controller (CCC) can be utilized to constrain a spatial contouring error, thus improving contour-following accuracy of three-axis computer numerical control (CNC) systems; wherein the method is as follows:

Step One: establishment of the equivalent plane;
(i) denoting an equation of a desired contour as $C=C(u)$, where u denotes curve parameter; (ii) denoting desired and actual motion positions $R=[r_x, r_y, r_z]$ and $P=[p_x, p_y, p_z]$, respectively; (iii) denoting $u_r$ as a parameter corresponding to the desired motion position; and (iv) defining a tangential error $d_t(u)$ on a point of the desired contour $C(u)$ as a projection of vector $C(u)-P$ on the tangential direction at the position of $C(u)$, and being computed as:

$$d_t(u) = (C(u) - P) \cdot \frac{C'(u)}{\|C'(u)\|} \quad (1)$$

where $C'(u)$ is the first-order derivative of $C(u)$ with respect to u, and $\|\ \|$ means the Euclidean norm;

where contouring error is defined as the orthotropic distance from the actual motion position to the desired contour; therefore, the tangential error $d_t(u)$ must be zero when $C(u)$ is the foot point from P to the desired contour; accordingly, foot-point parameter $u_f$ is obtained by solving $d_t(u)=0$; where tangential back-stepping point parameter $u_b$ is first calculated by projecting the tangential error to the desired contour as:

$$u_b = u_r - \frac{(C(u_r) - P_p) \cdot C'(u_r)}{\|C'(u_r)\|^2} \quad (2)$$

then, the tangential back-stepping point parameter $u_b$ is taken as the initial value of the Newton method so as to find the solution $u_N$ of $d_t(u)=0$ by:

$$u_N = u_b - \frac{(\|C'(u_b)\|^2 \cdot (C(u_b) - P) \cdot C'(u_b))}{\begin{pmatrix} \|C'(u_b)\|^4 + \|C'(u_b)\|^2 \cdot (C(u_b) - P) \cdot C''(u_b) - \\ ((C(u_b) - P) \cdot C'(u_b)) \cdot (C'(u_b) \cdot C''(u_b)) \end{pmatrix}} \quad (3)$$

and if $|d_t(u_N)| < |d_t(u_b)|$, thus indicating that the tangential back stepping based Newton algorithm is convergent, taking the solution as foot-point parameter $u_f$ where $u_f = u_N$; otherwise, applying the tangential back stepping based Newton algorithm again at $u_b$ to obtain the foot-point parameter $u_f$; to summarize, the foot-point parameter $u_f$ is calculated by the following equation:

$$u_f = \begin{cases} u_N, & |d_t(u_N)| < |d_t(u_b)| \\ u_b - \frac{(C(u_b) - P) \cdot C'(u_b)}{\|C'(u_b)\|^2}, & |d_t(u_N)| \geq |d_t(u_b)| \end{cases} \quad (4)$$

establishing an equivalent plane by passing through the actual motion position P and a tangential line of the desired contour at approximated foot point $C(u_f)$; where normal vector $n_E$ of the equivalent plane is computed by:

$$n_E = (C(u_f) - P) \times \frac{C'(u_f)}{\|C'(u_f)\|} \quad (5)$$

wherein × means outer production;

equivalent-plane horizontal axis, denoted as $X_E$, is taken as an intersection direction of the equivalent plane and original plane XY; and equivalent-plane vertical axis, denoted as $Y_E$, is taken as a direction that is perpendicular to $X_E$ and $n_E$; where $X_E$ and $Y_E$ are determined by:

$$\begin{cases} X_E = \dfrac{n_E \times [0\ 0\ 1]^T}{\|n_E \times [0\ 0\ 1]^T\|} \\ Y_E = \dfrac{X_E \times n_E}{\|X_E \times n_E\|} \end{cases} \quad (6)$$

Step Two: contouring-error calculation and cross-coupling control in the equivalent plane;

calculating the contouring error scalar form in the equivalent plane; where $X_E$-direction and $Y_E$-direction tracking errors from P to $C(u_f)$ are denoted as $e_{x,E}$ and $e_{y,E}$, respectively, and are computed as:

$$\begin{cases} e_{x,E} = (C(u_f) - P) \cdot X_E \\ e_{y,E} = (C(u_f) - P) \cdot Y_E \end{cases} \quad (7)$$

such that estimated contouring error $\hat{\varepsilon}$ is:

$$\hat{\varepsilon} = C_{x,E} \cdot e_{x,E} + C_{y,E} \cdot e_{y,E} \quad (8)$$

wherein $C_{x,E}$ and $C_{y,E}$ are $X_E$-direction and $Y_E$-direction cross-coupling gains, respectively, and are obtained by:

$$\begin{cases} C_{x,E} = -\sin(\theta) \\ C_{y,E} = \cos(\theta) \end{cases} \quad (9)$$

where $\theta$ is the included angle of vectors $C'(u_f)$ and $X_E$, and $$\theta = \arctan\left(\frac{C'(u_f) \cdot Y_E}{C'(u_f) \cdot X_E}\right);$$

when the PID controller based two-axis CCC is utilized to control the estimated contouring error $\hat{\varepsilon}$ as a control object, the output control signal of the CCC at time of t is thus obtained as:

$$U_c(t) = k_p \hat{\varepsilon} + k_i \int_0^t \hat{\varepsilon}\, dt + k_d \frac{d\hat{\varepsilon}}{dt} \quad (10)$$

where $k_p$, $k_i$, and $k_d$ are proportional, integral, and differential gains, respectively;

according to $U_c(t)$, $X_E$-direction and $Y_E$-direction control signals, denoted by $\Delta_{x,E}$ and $\Delta_{y,E}$ respectively, are computed as:

$$\begin{cases} \Delta_{x,E} = C_{x,E} \cdot U_c \\ \Delta_{y,E} = C_{y,E} \cdot U_c \end{cases} \quad (11)$$

Step Three: calculation of three-axis control signals in real space;

according to the geometry relationship between $X_E/Y_E$ and the spatial X/Y/Z axes, calculating coupling gains from an equivalent plane's two axes to real three-dimensional space's three axes as:

$$\begin{cases} k_{x,x} = X_E \cdot [1\ 0\ 0]^T \\ k_{x,y} = X_E \cdot [0\ 1\ 0]^T \\ k_{y,x} = Y_E \cdot [1\ 0\ 0]^T \\ k_{y,y} = Y_E \cdot [0\ 1\ 0]^T \\ k_{y,z} = Y_E \cdot [0\ 0\ 1]^T \end{cases} \quad (12)$$

where $k_{x,x}$, $k_{x,y}$ are gains from $X_E$ axis to X and Y axes, respectively, and $k_{y,x}$, $k_{y,y}$, and $k_{y,z}$ are gains from $Y_E$ axis to X, Y, and Z axes, respectively;

calculating X-axis, Y-axis, and Z-axis control signals, denoted by $\Delta_x$, $\Delta_y$, and $\Delta_z$, respectively, as:

$$\begin{cases} \Delta_x = k_{x,x}\Delta_{x,E} + k_{y,x}\Delta_{y,E} \\ \Delta_y = k_{x,y}\Delta_{x,E} + k_{y,y}\Delta_{y,E} \\ \Delta_z = k_{y,z}\Delta_{y,E} \end{cases} \quad (13)$$

and subsequently performing a curve-interpolation CNC motion in a three-axis CNC system by adding the obtained $\Delta_x$, $\Delta_y$, and $\Delta_z$ to control signals of X-axis, Y-axis, and Z-axis position loops within each interpolation period, the equivalent-plane cross-coupling control can hence be realized, which can reduce the three-axis spatial contouring error effectively.

\* \* \* \* \*